June 7, 1966   A. H. GOREY   3,254,585
FOCUSING MECHANISM FOR PHOTOGRAPHIC CAMERAS
Filed Feb. 10, 1964   2 Sheets-Sheet 1

INVENTOR.
ARCHIE H. GOREY
BY
ATTORNEY

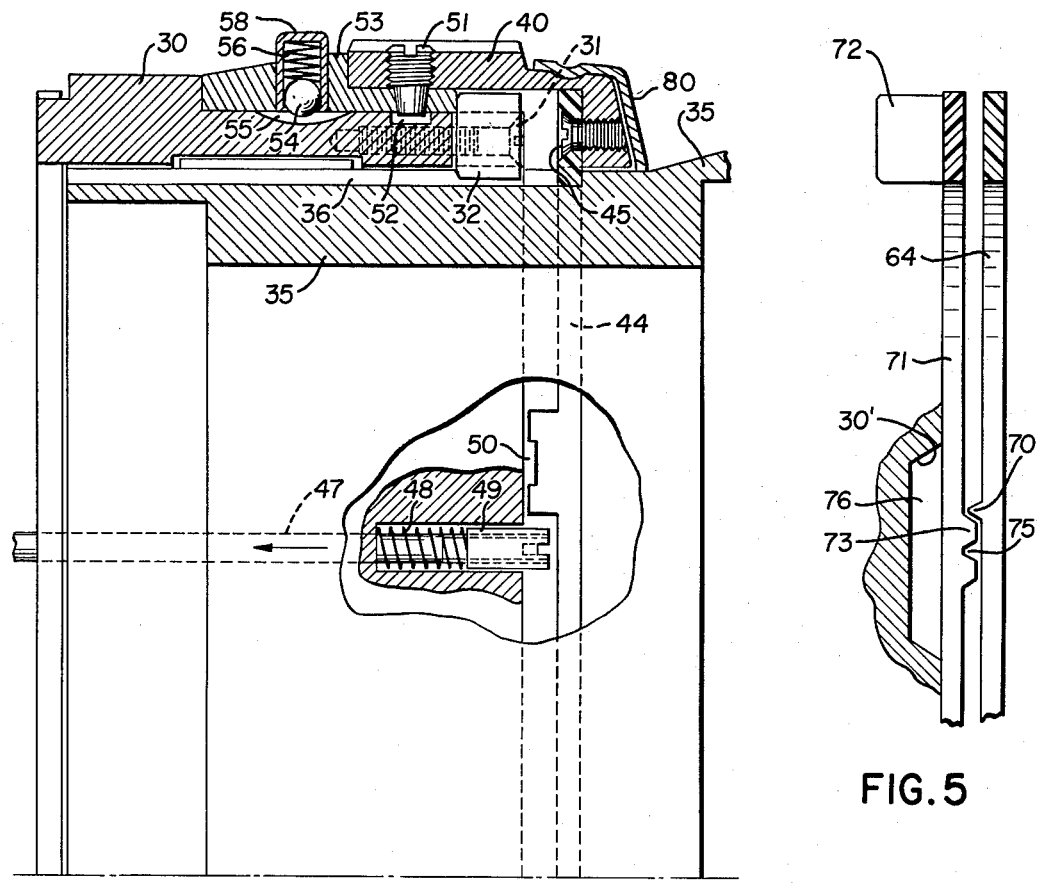
FIG. 4
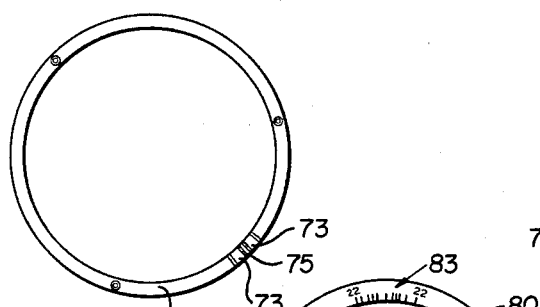
FIG. 5
FIG. 6
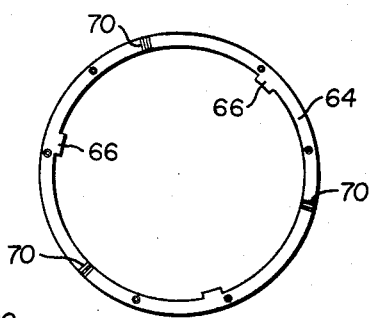
FIG. 7
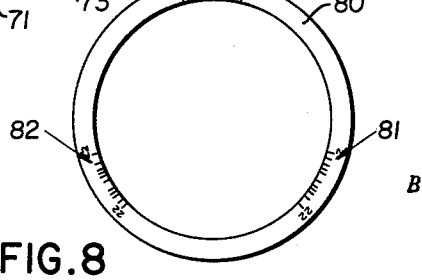
FIG. 8
*INVENTOR.*
ARCHIE H. GOREY
BY
ATTORNEY United States Patent Office 3,254,585
Patented June 7, 1966

3,254,585
FOCUSING MECHANISM FOR PHOTOGRAPHIC CAMERAS
Archie H. Gorey, Rochester, N.Y., assignor to Graflex, Inc., Rochester, N.Y., a corporation of Delaware
Filed Feb. 10, 1964, Ser. No. 343,710
9 Claims. (Cl. 95—45)

The present invention relates to photographic cameras, and more particularly to focusing mechanism for such cameras.

There are various types of focusing mechanisms used at present on cameras. Some employ a pin on the focusing ring engaging a helical slot on the lens barrel to effect the in-and-out focusing movement of the lens. In others a rack and pinion, or compound screw sleeves are used. In all prior known focusing mechanisms there is inherently backlash; and it is difficult to eliminate it. The known pin and slot mechanism, for instance, is subject to wear in use; and as it wears, unless some means is provided to compensate for wear, the backlash increases, and focusing is not precise.

A primary object of the present invention is to provide a focusing mechanism which is free from backlash not only initially but for the whole of the life of the focusing mechanism.

Another object of the invention is to provide a focusing mechanism which will permit quicker focusing.

Another object of the invention is to provide a focusing mechanism which will be inexpensive as compared to conventional focusing mechanisms.

Another object of the invention to to provide a focusing mechanism which is relatively inexpensive to seal and protect against entry of dirt therein.

Another object of the present invention is to provide a focusing mechanism which will be self-cleaning.

A further object of the invention is to provide a focusing mechanism which will permit replacement of worn parts easily and cheaply.

A still further object of the invention is to provide a focusing mechanism whose principal parts form part of the camera structure itself and not of the lens which is to be focused, with the result that the cost of interchangeable lenses is kept at a minimum.

Still another object of the invention is to provide a focusing mechanism in which only one movement is required to change lenses.

Other objects of the invention will be apparent hereinafter from the specification and from the recital of the appended claims particularly when read in conjunction with the accompanying drawings.

In the drawings:

FIG. 4 is a section through the nose of a camera showing a focusing mechanism constructed according to another embodiment of this invention;

FIG. 5 is a fragmentary section illustrating another embodiment of the invention;

FIG. 6 is a front elevation of the detent ring used in this last embodiment of the invention;

FIG. 7 is a rear elevation of the actuating ring which cooperates therewith; and FIG. 8 is a front elevation of the shroud for the focusing mechanism shown in FIG. 4.

Figure 1:
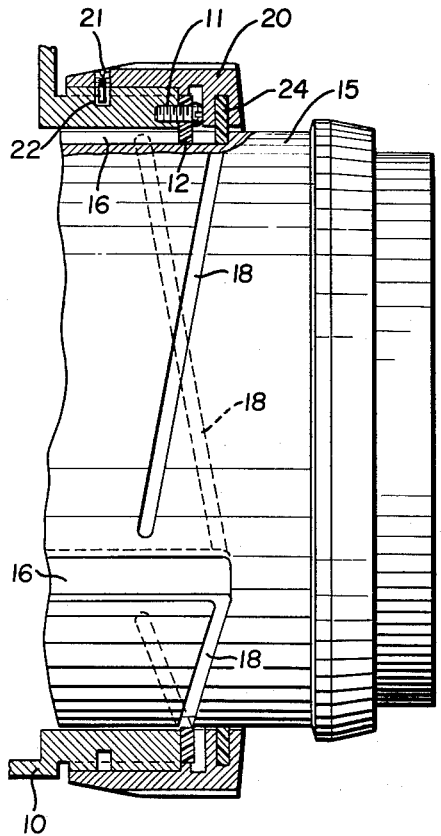
FIG. 1 is a sectional view of a lens barrel and a mount therefor, showing a focusing mechanism built according to one embodiment of this invention.
Figure 2:
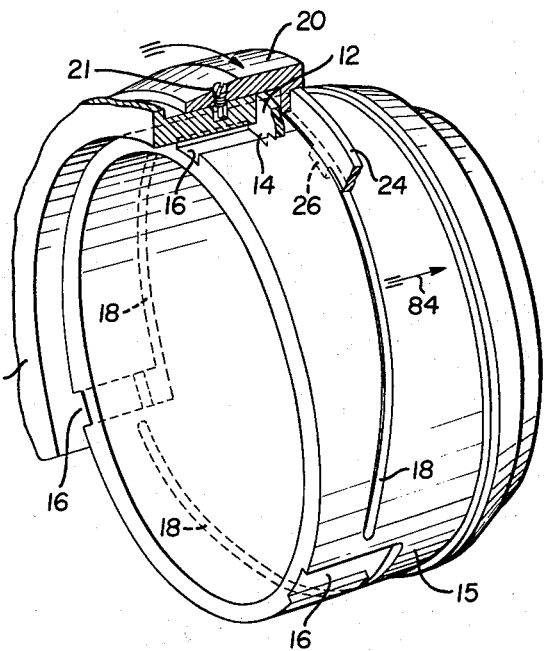
FIG. 2 is a perspective view further illustrating this structure.
Figure 3:
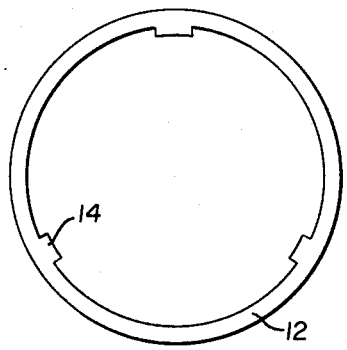
FIG. 3 is an end view of one of the rings used in this focusing mechanism.

Referring now to the drawings by numerals of reference, and first to the embodiment of the invention shown in FIGS. 1, 2 and 3, 10 denotes the nose-piece or lens mount of the camera. This is fixed to the camera. Secured to this nose piece 10 by screws 11 is a guide ring 12, which is formed internally with three straight, axially-extending drive lugs 14 (FIG. 3).

15 denotes the barrel of a known between-the-lens-shutter. This barrel has three straight, equiangularly spaced slots 16 on its periphery, which extend parallel to its axis and are adapted to be engaged by the three lugs 14, respectively. The barrell also has three helical grooves 18 around its periphery, one end of each of which extends into each of the slots 16. These grooves extend from one slot 16 to or near the next slot.

20 denotes the focusing ring, which is rotatably mounted on the nose 10. A pin 21, which threads into this ring, engages at its inner end in a circumferential groove 22 in the nose 10 to prevent axial movement between the focusing ring and the nose. Fixedly secured, as by means of screws, not shown, inside the focusing ring 20 is a "Delrin" or other flexible plastic ring 24. The ring 24, like the ring 12, has three, equiangularly spaced lugs 26 (FIG. 2) formed internally therein. These three lugs engage, respectively, in the three helical grooves 18 formed in the lens barrel.

To insert a lens barrel 15 into the lens mount or to remove a lens barrel therefrom, the focusing ring 20 is adjusted angularly until the lugs 26 of ring 24 are in alignment with the lugs 14 of ring 12. The lugs 26 will then align with the slots 16 in the barrel; and the barrel can be inserted into or removed from the lens mount. Thus, lenses can be interchanged quickly and easily.

In the construction shown in FIG. 4, 30 denotes the nose piece, which is again secured to the face of the camera. Secured to the face of the nose piece 30 by screws 31 are three equiangularly spaced blocks 32. Each of these blocks is adapted to engage into an axially extending slot 36 in the lens barrel 35 that is to be mounted on the camera. Each of the lens barrels, which are interchangeably mountable in this camera, is provided with three helical grooves (not shown) in its periphery similar to those shown at 18 in FIGS. 1 and 2. Focusing is effected as in the first described embodiment of invention by rotary adjustment of a focusing ring 40, to which there is secured by means of screws 45 a plastic actuating ring 44, which is formed with lugs or tabs (not shown), similar to those shown at 26 in FIG. 2, that engage in the helical grooves of the lens barrel.

To hold the ring 44 so that the lens barrel is locked to the camera, that is, so that the tabs of ring 44 are out of registry with the slots 36 in the barrel, a spring-pressed plunger 47 is mounted slidably in the wall of the nose 30. A coil spring 48, which surrounds the plunger and engages against its enlarged head 49, constantly urges the plunger toward the ring. The ring 44 is formed on its rear face with a notch 50. Access to the rod or plunger 47 can be had through the camera housing; and when the rod 47 is pulled back against the resistance of the spring 48 and the focusing ring 40 is rotated, the rod will ride on the rear face of the ring 44 until it snaps into the notch 50. At this position, the lugs or tabs on the ring 44 will align with the slots 36 in the lens barrel so that the lens barrel can be pulled out of the camera. The rod 47 will then hold the ring in position so that another lens barrel can readily be inserted into the camera. A lever can be used to move the rod 47 rearwardly against the resistance of the spring 48.

A pin 51, which is screwed into the focusing ring 40, and which passes through a ring 53, and engages in a circumferential groove 52 in the nose 30, serves to prevent relative axial movement between the nose or lens mount and the focusing ring. A spring-pressed ball detent 54, which is adapted to engage in angularly-spaced notches 55 in the nose 30, acts as a click-stop to hold the focusing ring in any adjusted position. The detent 54 is constantly urged to holding position by a coil spring 56 which is housed in a cup 58 that is threaded into or has a pressed fit in ring 53, or is otherwise secured thereto. Pin 51 secures ring 53 to rotate with focusing ring 40.

A somewhat different means for centering the lugs or tabs of the actuating ring is shown in FIGS. 5 to 7. Here the actuating ring is denoted at 64. It has internally-disposed lugs or tabs 66 similar to the rings 24 and 44 previously described, which engage in helical grooves in the lens barrels; and it is provided on its rear face with at least one lug 70.

A plate or ring 71 is secured to blocks 72, which, like the blocks 32, engage in slots, like slots 36, that extend parallel to the axis of the lens barrel. This ring or plate 71 has a lug or block 73 that protrudes forwardly and against which the lug 70 of the actuating ring 64 ordinarily engages. This ring or plate 71 is also formed with a notch 75, in which the lug 70 can engage. The nose of the lens mount, here denoted at 30', is formed on its front face with a recess 76.

The ring or plate 71 is made of a flexible plastic. When the camera is in use, the lug 70 on the ring 64, stops against the block 73 of ring 71. In this position the tabs 66 on the ring 64 are out of alignment with the slots 36 (FIG. 4), in the lens barrel, and the lens barrel is locked in the camera. When it is desired to remove the lens barrel from the camera, however, an additional rotational force on the focusing ring 40 will cause the lug 70 of the ring 64, which is secured to the focusing ring, to deflect the plate 71 into recess 76 so that the lug 70 will ride over lug 73 into the notch 75 and align the lugs 66 on the ring 64 with the slots 36 in the lens mount. This will enable the lens barrel to be removed from the mount and to be replaced by another lens mount. After the new lens barrel has been pushed into the mount, turning of the ring 64 snaps the lug 70 out of the notch 75.

With the construction shown due to the inherent resiliency of the plastic rings 24, 44 and 64, the tabs, such as tabs 26 and 66, can engage in the helical grooves, such as grooves 18, of the lens barrels because the plastic will yield and bend to permit this engagement of the tabs with the helical grooves while the main body itself of the ring 24, 44, or 64 is held flat in the focusing ring 20 or 40 by screws such as the screws 45 (FIG. 4). The tabs of the plastic rings will always tend, however, to resume their normally flat positions in the planes of the rings 24, 44, 64 themselves so that play between the tabs of these rings and the helical grooves of the lens barrels is taken up. The result is a backlash-free arrangement for moving the lens barrels smoothly in and out of the lens mount in a straight line during focusing.

A flexible metal shroud 80 (FIG. 8), which may be provided with different focusing scales on its front face, as denoted at 81, 82 and 83, has a snap fit over the focusing ring 40 of the lens mount so as to permit precise focusing adjustment of the different lenses, such as wide angle, normal, and telescopic, which may be used in the camera. The graduations on the scales read against index marks, such as shown in FIG. 2 at 84, on the different lens barrels. The actuating ring 64 is then provided with a plurality of lugs 70, equiangularly spaced from one another, one for each of the scales 81, 82, 83, for selective engagement with the notch 75 in the ring 71 so as to adjust each lens to read against its proper scale on the shroud 80.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A focusing mechanism for photographic cameras, comprising
   (a) a bored lens mount,
   (b) a lens barrel removably disposed in the bore of said mount and having a helical groove around its periphery,
   (c) a focusing ring rotatable on said mount to surround said barrel, and
   (d) means connecting said focusing ring to said barrel to effect axial movement of said barrel upon rotation of said focusing ring comprising a first, normally-flat flexible plastic ring secured to said focusing ring to surround said barrel and to rotate with said focusing ring and having an integral, internally-disposed tab to engage in said groove, and
   (e) means for preventing rotation of said barrel during rotation of said rings.

2. A focusing mechanism for photographic cameras as claimed in claim 1, wherein
   (a) the lens barrel has additionally a straight groove in its periphery which extends parallel to the axis of the barrel, and
   (b) the means for preventing rotation of the barrel during rotation of said rings comprises
   (c) second plastic ring fixed to said mount and having an integral internal tab thereon to engage in said straight groove.

3. A focusing mechanism as claimed in claim 2, wherein said two plastic rings are identical.

4. A focusing mechanism for photographic cameras comprising
   (a) a bored lens mount,
   (b) a lens barrel removably disposed in the bore of said mount for axial adjustment in said bore, and having a helical groove around its periphery and a straight groove in its periphery extending in the direction of the axis of said barrel,
   (c) a focusing ring rotatable on said mount to surround said lens barrel,
   (d) a normally-flat flexible plastic ring secured to said focusing ring to surround said barrel and to rotate with said focusing ring and having an integral, internally-disposed tab to engage in said helical groove,
   (e) means secured to said mount and engaging in said straight groove to hold said barrel against rotation during rotation of said rings, and
   (f) means for releasably limiting movement of said plastic ring to prevent its tab from aligning with said straight groove.

5. A focusing mechanism as claimed in claim 4, wherein the means engaging said straight groove comprises a block secured to said mount.

6. A focusing mechanism as claimed in claim 4, wherein the means for releasably limiting movement of said plastic ring comprises
   (a) a lug on the rear face of said plastic ring,
   (b) a plunger slidably mounted in said mount and
   (c) a spring constantly urging said plunger into position to engage said lug.

7. A focusing mechanism as claimed in claim 5, wherein the means for releasably limiting movement of said plastic ring comprises
   (a) a lug on the rear face of said plastic ring,
   (b) a second plastic ring secured to said block and
   (c) a stop lug on the front face of said second plastic ring positioned to engage the first-named lug,
   (d) said second plastic ring having a slot therein in which said first-named lug is adapted to be engaged when a torsional force is applied to the first-named plastic ring sufficient to cause said first-named lug to ride up on and over said stop lug, and (e) the mount having a recess in it registering with said stop lug and said slot to permit deflection of said second plastic ring under said torsional force.

8. A focusing mechanism for photographic cameras comprising (a) a bored lens mount,
(b) a lens barrel removably disposed in the bore of said mount and having a plurality of helical grooves spaced from one another around its periphery and having the same number of straight grooves spaced from one another around its periphery and extending in the direction of the axis of said barrel,
(c) a focusing ring rotatable on said mount,
(d) a normally flat, flexible plastic ring secured to said focusing ring to surround said barrel and to rotate with said focusing ring and having a plurality of angularly-spaced, integral, internally-arranged tabs, equal in number to said helical grooves and disposed to engage said helical grooves,
(e) means secured to said mount and engaging in said straight grooves to hold said barrel against rotation during rotation of said rings,
(f) said focusing ring having thereon a plurality of sets of focusing scales angularly spaced from one another,
(g) said barrel having an index mark thereon readable against each of said scales, respectively, in different selected angular positions of mounting of said barrel in said mount, and
(h) a plurality of means equal in number to said scales for limiting angular movement of said focusing ring in the different angular positions of mounting of said barrel.

9. A focusing mechanism as claimed in claim 8, wherein (a) the means for holding the barrel against rotation comprises a plurality of blocks equal in number to said straight grooves and secured to said mount in angularly spaced relation to register with and engage in said straight grooves, and
(b) said limiting means comprises a plurality of first lugs integral with said plastic ring, one for each scale and spaced angularly from one another in accordance with the angular spacing of said scales, and a second plastic ring secured to said blocks and having a stop lug integral with it, said stop lug being disposed to engage one of said first lugs in the different angular positions of mounting of said barrel in said mount to limit the angular movement of said focusing ring for each scale, said second plastic ring being deflectable to allow the first lug which in a given angular position of said first plastic ring is associated with said stop lug to ride over said stop lug to permit alignment of said tabs with said straight grooves.

References Cited by the Examiner

UNITED STATES PATENTS 2,762,261 9/1956 Herden _____ 95—45 X
2,959,112 11/1960 Dalton _____ 95—48
3,090,282 5/1963 Angenieux _____ 95—45 X JOHN M. HORAN, *Primary Examiner.*